(12) United States Patent
Wilhem et al.

(10) Patent No.: US 6,758,586 B1
(45) Date of Patent: Jul. 6, 2004

(54) AIRCRAFT LIGHTING MEANS COMPATIBLE WITH A NIGHT VISION IMAGING SYSTEM

(75) Inventors: Jean-Marc Wilhem, Six Fours (FR); Robert Prandi, Bourg-les-Valence (FR)

(73) Assignee: Wilco International, La Seyne-sur-Mer (FR)

( * ) Notice: Subject to any disclaimer, the term of this patent is extended or adjusted under 35 U.S.C. 154(b) by 25 days.

(21) Appl. No.: 09/636,565

(22) Filed: Aug. 10, 2000

Related U.S. Application Data

(63) Continuation of application No. PCT/FR99/00423, filed on Feb. 24, 1999.

(30) Foreign Application Priority Data

Feb. 24, 1998 (FR) ............................................. 98 02310

(51) Int. Cl.[7] ................................................. F21V 9/00
(52) U.S. Cl. ........................ 362/471; 362/230; 362/231; 362/800
(58) Field of Search ................................ 362/471, 230, 362/231, 800

(56) References Cited

U.S. PATENT DOCUMENTS

| | | | |
|---|---|---|---|
| 4,580,196 A | | 4/1986 | Task |
| 4,779,942 A | * | 10/1988 | Verney ........................ 350/1.1 |
| 5,031,080 A | * | 7/1991 | Aikens et al. ................ 362/62 |
| 5,083,246 A | | 1/1992 | Lambert |
| 5,124,892 A | * | 6/1992 | Lambert ...................... 362/103 |
| 5,539,628 A | * | 7/1996 | Seib ............................. 362/293 |
| 5,655,830 A | | 8/1997 | Ruskouski |
| 5,685,637 A | | 11/1997 | Chapman et al. |
| 5,851,063 A | * | 12/1998 | Doughty et al. ............ 362/231 |
| 6,069,440 A | * | 5/2000 | Shimizu et al. ............. 313/486 |
| 6,084,250 A | * | 7/2000 | Justel et al. .................. 257/89 |
| 6,227,679 B1 | * | 5/2001 | Zhang et al. ............... 362/236 |
| 6,244,728 B1 | * | 6/2001 | Cote et al. .................. 362/249 |
| 6,247,825 B1 | * | 6/2001 | Borkowski ................... 362/23 |
| 6,268,702 B1 | * | 7/2001 | Fleck ..................... 315/185 R |
| 6,294,800 B1 | * | 9/2001 | Duggal et al. ................ 257/89 |
| 6,351,079 B1 | * | 2/2002 | Willis ..................... 315/200 A |

FOREIGN PATENT DOCUMENTS

| | | |
|---|---|---|
| EP | 0 540 140 A1 | 5/1993 |
| EP | 0 808 082 A1 | 11/1997 |
| WO | WO 96/27896 * | 9/1996 |

OTHER PUBLICATIONS

Bill Schweber, Aug. 2, 2001, techtrends, pp. (75–82).*
Edwin Bernard, "High Performance Modern Avionic Instruments–The LED Flat Panel Display Solution"*SAE Technical Paper Series*, pp. 1–9, Oct. 1990.

* cited by examiner

*Primary Examiner*—Alan Cariaso
*Assistant Examiner*—Jacob Y. Choi
(74) *Attorney, Agent, or Firm*—Akin Gump Strauss Hauer & Feld, LLP

(57) ABSTRACT

The invention concerns lighting means compatible with a light-intensifying night vision imaging system, comprising at least an electroluminescent source of polychromatic white light (15) with high radiant energy in violet/blue wavelength band of and with low residual energy in red wavelength band.

49 Claims, 7 Drawing Sheets

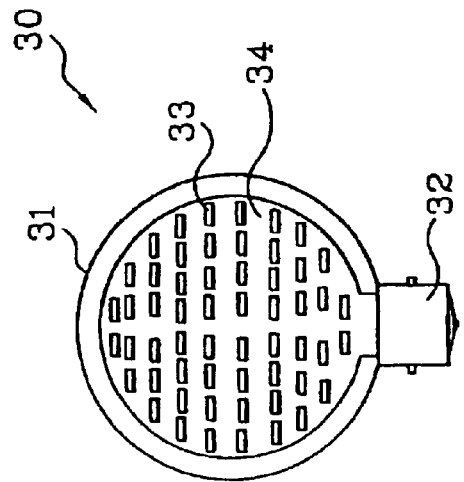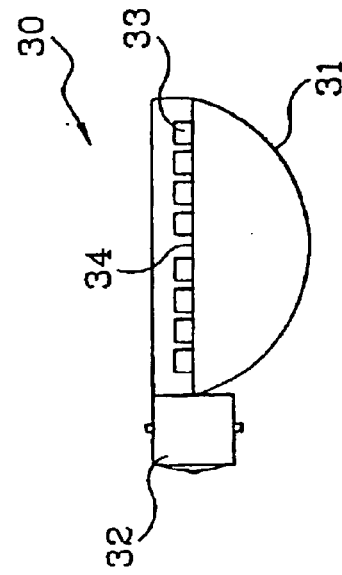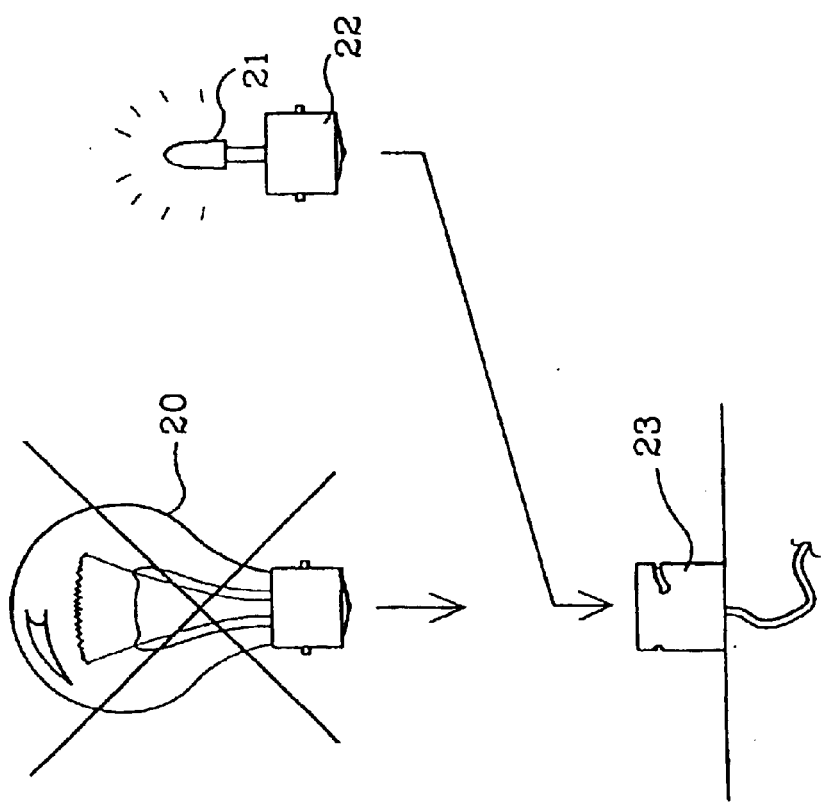

AIRCRAFT LIGHTING MEANS COMPATIBLE WITH A NIGHT VISION IMAGING SYSTEM

CROSS-REFERENCE TO RELATED APPLICATION

This application is a continuation of International Application No. PCT/FR99/00423 filed Feb. 24, 1999 the disclosure of which is incorporated herein by reference.

BACKGROUND OF THE INVENTION

The present invention relates to a lighting means compatible with a light intensifier night vision imaging system.

The present invention relates especially but not exclusively to lighting systems, lighting means and lighting or lit objects present in or on aircraft, for example instrument panel lighting systems, light scattering devices for ambient light in pilot's cockpits, light indicators, luminous graphics display systems, position or navigation lights, landing lights, flight training lights, anti-collision lights, etc.

Recent years have seen the emergence in the market of aeronautical equipment for night vision systems to facilitate night flying and overcome the lack of the sensitivity of the human eye to light in the infrared range, namely at wavelengths of more than about 770 nm. These systems, generally known as NVIS (night vision imaging systems) are highly sensitive to infrared radiation up to wavelengths of about 900 nm. They usually take the form of goggles comprising two light intensifiers, each intensifier being comparable to a miniature video camera delivering an electronic image of the external environment. Even in the greatest darkness, a night imaging system delivers a clear, high-contrast monochromatic image of the external environment.

Very briefly, it may be recalled with reference to FIG. 1 that a light intensifier comprises a vacuum tube 2 having a photocathode 3 at its first end that converts the photons from the image received on its external face into an electron beam whose density and distribution are a function of the image. The electron beam is sent to a phosphor screen 4 positioned at the other end of the tube 2 by means of an amplifier plate 5. The amplifier plate 5 has numerous microchannels 6 covered with a secondary high-emission coating whose role is to greatly increase the number of electrons sent by the photocathode 3. The amplifier plate is driven by a circuit 7 called an "automatic gain control" circuit. This circuit 7 is a feedback circuit that optimizes the gain, namely the intensifying level, as a function of the ambient luminosity and gives a result comparable to the closing or opening of a diaphragm. Without this protection circuit, an increase in the ambient light energy in the band of sensitivity of the photocathode would prompt an immediate increase in the flow of electrons and would lower the sensitivity and resolution. The circuit 7 prompts the total extinction of the intensifier tube when there is a sharp variation in the radiant energy.

As light intensifiers have undergone various improvements since their appearance, there are now two types of light intensifiers using concurrent technologies on the market. These are GEN2 (second generation) and GEN3 (third generation) intensifiers. GEN3 tubes have a gallium arsenide photocathode and can be distinguished by their very high sensitivity to radiant energy, namely a sensitivity of about 1200 to 1800 $\mu$A/lm depending on the models, and a fairly selective passband ranging from 600 nm (at the borderline limit between the yellow and the red wavelengths) to 900 nm. The GEN2 tubes have a tri-alkaline photocathode with lower sensitivity, of about 500 to 800 $\mu$A/lm, and a wider passband ranging from 400 to 900 nm and covering the visible spectrum. For a clearer picture, the curves 10 and 11 of FIG. 2 respectively show the gain G of the tubes GEN2 a GEN3 as a function of the wavelength $\lambda$. Despite their lower sensitivity, tri-alkaline photocathodes have a better signal-to-noise ratio than gallium arsenide photocathodes so that there are GEN2 type night vision systems that are equal to GEN3 type night vision systems in terms of resolution and image quality.

SUMMARY OF THE INVENTION

In practice, an essential goal to be achieved is that aircraft pilots should be able to use night vision goggles while continuing to be able to consult their panel instruments. This goal, which is essentially ergonomical, requires that two conditions should be met:

firstly, the intensifier tubes should not entirely mask the pilot's visual field, secondly, the lighting of the aircraft should not disturb the intensifier tubes by giving rise to parasitic halos or ghost images due to the reflection of illuminated objects on the windows of the cockpit.

With regard to the first condition, various ergonomical studies conducted in recent years have given rise to two types of night imaging goggles known as type I and type II goggles according to the MIL-L-85762A standard to which reference is made herein purely for reasons of convenience, the above-mentioned classification being frequently used by those skilled in the art. The I type goggles, designed for piloting helicopters, are fixed to the pilot's helmet so that the two phosphor screens are before the pilot's eyes at a minimum distance enabling him to see the panel instruments when he looks down. The type II goggles, designed for fixed-wing aircraft, work like a head-up display unit: the image delivered by the phosphor screens is projected before the pilot's eyes by transparent lenses through which the panel instruments can be viewed in simultaneous juxtaposition.

Furthermore, the risks of interference between the light sources of the aircraft and the night vision goggles are eliminated by a retrofitting of the aircraft lighting system. This retrofitting operation essentially consists in securing all the light sources to a monochromatic color that is as far as possible from the red wavelengths band. Indeed, as can be seen in FIG. 2, the GEN2 or GEN3 type night imaging goggles do not have a passband limited to the infrared and have high sensitivity to the wavelengths in the red range, in a band that substantially covers 600 to 770 nm (herein with a view to simplicity, it is assumed that the red band also covers the orange and yellow wavelengths since, in practice, there is no purely monochromatic light: any orange or yellow light source inevitably includes a red component). In the prior art, the red wavelengths band is thus considered to be a critical band in which any emission of light is likely to greatly disturb night vision goggles by causing the activation of the automatic gain control circuit (namely the closing the electronic shutter). In particular, white incandescent lights are not allowed since they contain a high proportion of red and infrared light.

Thus, in practice, the retrofit of an aircraft illumination system consists in encapsulating the incandescent white lamps with lowpass attenuator filters and replacing the other white incandescent white lamps by light-emitting diodes or light-emitting panels scattering a narrow and green colored light also called an "aviation green" centered on the 555 nm.

In general, the white incandescent lamps to be encapsulated are the yellow, orange and red lamps of warning indicators and alarm indicators. The incandescent white lamps need to be replaced by green light-emitting diodes and are for example green indicator lamps, used for the lighting of the instrument panel as well as backlighting lamps which, by transparency, reveal luminous graphic characters on an instrument panel. Finally, the lights used for ambient illumination are generally replaced by green light-emitting panels with which a mechanical scattering device with swiveling shutters is associated.

This kind of retrofitting of lighting means for an aircraft has various drawbacks. Firstly, it gives a greenish ambient light that very substantially attenuates the readability of the panel instruments and dilutes the colors. Thus, for example, the white or yellow, orange and red paint on the panel instrument packs (used for example to define and demarcate the operating modes of an engine) are respectively seen as green, light brown or dark brown. Again, the green lighting makes it difficult and tiresome to read the navigation maps. Furthermore, the red alarm indicators and those that have a red component like the yellow and orange indicators have mediocre luminosity and unsatisfactory coloring owing to the high absorption of the attenuator filter. Finally, yet another drawback of a retrofit operation of this kind is the high cost of the attenuator filters.

In the prior art, these drawbacks are considered to be inherent because it is sought to reconcile the infrared vision of the external environment with the natural vision of the panel instruments. It is furthermore considered that the "aviation green" color at 555 nm is the ideal color to reconcile the various requirements. Firstly, this green is distant enough from the red not to disturb the nightvision system. Secondly, the green light-emitting diodes (as well as the green light-emitting panels) are "clean" and emit practically no energy in the red band, namely beyond 600 nm. Finally, green is the color where the sensitivity of the human eye is the maximum, so that it is preferred to the blue. More specifically, apart from its low sensitivity in the blue, the human eye has high remanence in the blue. This is considered to be incompatible with night vision.

Despite these various considerations which have led those skilled in the art to make the technological choices just described, the present invention is based on a surprising observation whose significance runs counter to prevailing assumptions and standards. According to this observation, a white color emitted by a light source working by electroluminescence in no way disturbs the presently known night vision systems, whether of the GEN2 type or of the GEN3 type. More specifically, the white light-emitting diodes as well as the white light-emitting panels available in the market of luminous components, normally intended for large-scale consumer applications, emit radiation that does not activate the automatic gain control circuit of a night vision system and does not even need to be filtered in the critical band of the red to offer these advantages. A non-disturbing radiation of this type however has a red component, but one with a low energy component. Here below, we shall see the explanations that may be given for this very advantageous compatibility of the white light-emitting sources with light intensifier systems. In any case, the discovery made by the Applicant has a considerable practical consequence for the field of aeronautics which is that it can offer aircraft pilots viewing comfort comparable to that of daylight while enabling the infrared display of the external environment by means of a light intensifier system without any risk of the untimely activation of an automatic gain control circuit.

Thus, the present invention proposes a lighting means compatible with a light intensifier night vision system comprising at least one light-emitting source of a white light with low radiant energy in the red wavelengths band.

The invention is made with a lighting means compatible with a light intensifier night imaging vision system whose particular feature is that it includes at least one light-emitting source of polychromatic white light with high radiant energy in the violet/blue wavelengths band, and with low residual energy in the red wavelengths band.

The polychromatic white light may furthermore have high radiant energy in the green/yellow and/or orange wavelengths bands with low residual energy in the red wavelengths band.

Preferably, the white light-emitting source has an emission spectrum comprising a dominant in the violet/blue wavelengths band and a dominant in the green/yellow wavelengths band.

Preferably, the white light-emitting source has a bichromatic-dominant emission spectrum with a violet/blue chrominance peak and a very wide range of chrominance from the green to the orange.

Preferably, the light-emitting source has an emission spectrum having a main peak wavelength of less than 492 nanometers, the main peak being a narrow high-intensity peak, and a secondary peak wavelength ranging from 492 to 622 nanometers, the secondary peak being a wide, medium-intensity peak, with very, low residual intensity at wavelengths of over 622 nanometers.

Advantageously, the white light-emitting source can give direct lighting, ambient lighting or indirect lighting or lighting without filtering in the red wavelengths band.

According to one embodiment, the white light-emitting source gives lighting guided in a translucent board of the instrument panel.

According to one embodiment, the light source is a white light-emitting diode.

For example, the light-emitting diode may be mounted on a screw-in or bayonet type socket. It may also be used instead of the standard incandescent lamp.

To light up the graphics of an instruments panel, the light-emitting diode is placed behind an opaque panel comprising transparent zones that form graphic characters.

To form a colored indicator, especially a green, yellow or red indicator, the light-emitting diode is covered with a colored hood that is not filtered in the red wavelengths band.

For ambient light, especially in a cockpit or an instruments panel, the lighting means according to the invention may include a ramp of white light-emitting diodes. The lighting means may also include a white light-emitting panel.

The present invention also relates to a means of lighting, especially for position indicators, landing lights, anti-collision lights or flight training lights in an aircraft comprising a plurality of light-emitting diodes arranged on a printed circuit.

Advantageously, the printed circuit is fixedly joined to a screw-in or bayonet type socket.

Advantageously, the polychromatic white light-emitting source is used with a light intensifier night vision imaging system with no filtering of the night imaging system in the visible wavelength bands.

The present invention also relates to an aircraft including a light-emitting means of the type described here above.

The present invention also relates to a lighting system comprising means of lighting in the visible range, means of lighting in the infrared range and switching means to make a choice between a lighting position in the visible range and a lighting position in the infrared range, characterized in that the means of lighting in the visible range include at least one light-emitting diode emitting a polychromatic white light with high radiant energy in the violet/blue wavelengths band and low residual energy in the red wavelengths band.

The present invention also relates to a method for retro-fitting an aircraft lighting system comprising incandescent lamps to a light intensifier night vision imaging system in which at least a part of the incandescent lamps are replaced by light-emitting diodes emitting a polychromatic white light with high radiant energy in the violet/blue wavelengths band and low residual energy in the red wavelengths band.

Also, to retrofit a system of position lights or flight training lights comprising incandescent lamps, each incandescent lamp is replaced by a plurality of light-emitting diodes emitting a polychromatic white light with high radiant energy in the violet/blue band of wavelengths and low residual energy in the red wavelengths band.

The polychromatic white light of the system may furthermore have high radiant energy in the green/yellow wavelengths band and/or the orange wavelengths band with low residual energy in the red wavelengths band.

Advantageously, the light emitted by the white light-emitting diodes is not filtered in the red wavelengths band.

BRIEF DESCRIPTION OF THE SEVERAL VIEWS OF THE DRAWINGS

These objects, characteristics and advantages of the present invention shall be explained in greater detail in the following description of the invention and of exemplary applications made on a non-restrictive basis and with reference to the appended figures, of which:

FIG. 4 illustrates an application according to the invention of a white light-emitting diode, FIGS. 5A and 5B respectively show a top view and a sectional view of another application, according to the invention, of a white light-emitting diode.

DETAILED DESCRIPTION OF THE INVENTION

The present invention is based on the observation that the light emitted by the commercially available sources known as white light-emitting sources in no way disturbs the presently known night vision systems, whether of the GEN2 type or of the GEN3 type.

The term "white light-emitting sources" designates white light-emitting diodes as well as the white light-emitting panels available in the market of luminous components. These components are designed normally for large-scale consumer applications, for example to indicate emergency exits or make illuminated advertisement hoardings etc. They are used because they consume little power and are long-lived.

Figure 3:
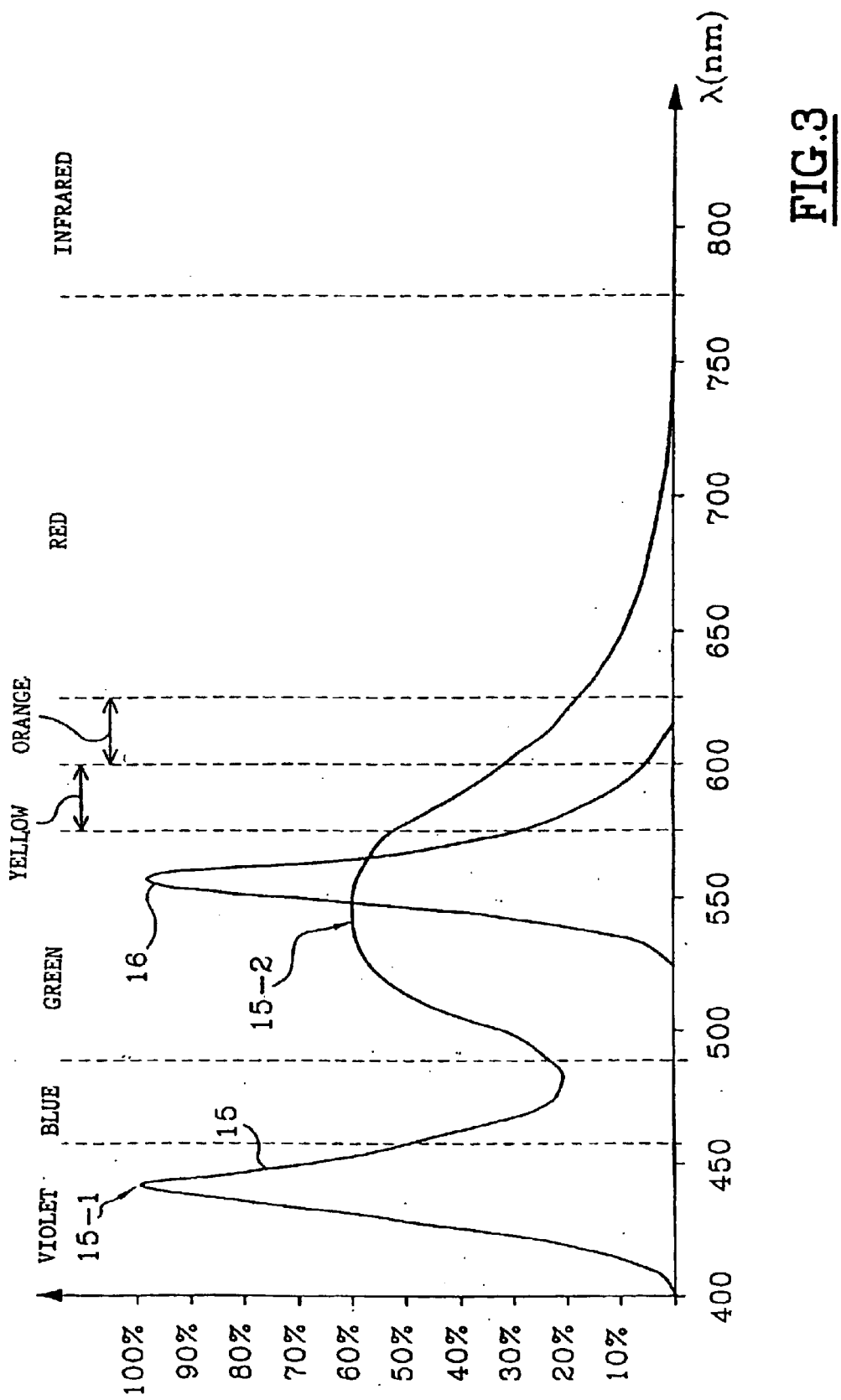
FIG. 3 shows the curves of the relative intensity as a function of the wavelength of the light emitted by a green light-emitting diode and a white light-emitting diode.

FIG. 3 shows a curve 15 corresponding to the relative intensity, as a function of the wavelength, of the light emitted by a white light-emitting diode referenced T1 WHITE LED LE-W31N marketed by the Swiss company SLOAN. This low-voltage diode working at less than 3.6 V/20 mA has the advantage of a high output of 5 lm/W which makes it compatible with the lighting of instrument panels. At the side of the curve 15, there is also a curve 16 corresponding to the relative intensity of a green light-emitting diode used in conventionally in aeronautics. The white diode was tested by the Applicant with a GEN3 type intensifier system marketed under the reference OB56 by the French firm SFIM as well as with a GEN2 intensifier system marketed under the reference SUPERGEN by the firm PHILIPS. In an surprising way, the indirect lighting tests (ambient light) have shown that the white light-emitting diode sends out radiation that does not create any halo or ghost image in the night vision system and does not activate the automatic gain control circuit. These highly advantageous results have been obtained without any filtering of the white light or filtering of the night vision system. Even more surprisingly, direct lighting tests (night vision goggles oriented directly towards the light source) have shown that the automatic gain control system of a night vision system is more sensitive to, the green light-emitting diodes used in the prior art (curve 16) than to the white light-emitting diodes discovered by the Applicant (curve 15).

This surprising result has several aspects. Firstly, as we have seen in FIG. 3, the spectrum of wavelengths of the white light-emitting diode extends up to the red band. Furthermore, for identical light intensity (power emitted per unit of solid angle), the white diode delivers illumination (power received per unit of surface area) that is significantly higher than the standard green diode (at least two to three times higher). This means that it might have been expected that there would have been an even greater incompatibility of the white diodes with the light intensifier system.

The Applicant, without vouching for the hypothesis, has put forward an explanation according to which the energy emitted by the white light-emitting diode in the critical band of the red is very low and represents only 5 to 7% of the total light energy (the area of the curve 15), which is highly centered on the violet/blue band and on the green band where there are two peaks of intensity 15-1, 15-2. It furthermore seems that this total distribution of the energy between the violet/blue band and the green band contributes to the result obtained, with the mean energy finally being at a greater distance from the red than the energy sent by a green light-emitting diode.

Furthermore, the Applicant has made certain of the stability (or repeatability) of the result obtained and has tested other white light-emitting sources manufactured by other manufacturers which also give excellent results. In particular, the Applicant has tested white light-emitting diodes commercially distributed under the reference LED WHITE PLANE by the firm MICHIA as well as white light-emitting panels for large-scale consumer uses commercially distributed under the reference COLOR WHITE by the British firm DANIELSON which, in its catalogue, also proposes green light-emitting panels for aeronautics under the reference AVIATION GREEN.

However, it is up to those skilled in the art, by simple practical tests, to ascertain that such and such a white light-emitting diode available in the market gives the results of the invention. In principle, it is believed by the Applicant that this result should be achieved inasmuch as the radiant energy emitted in the critical band of the wavelengths of the red is low. The influence of this distribution of energy between the violet/blue bands and the green/yellow bands is the object of the physical explanations given here below as an indication.

Figure 1:
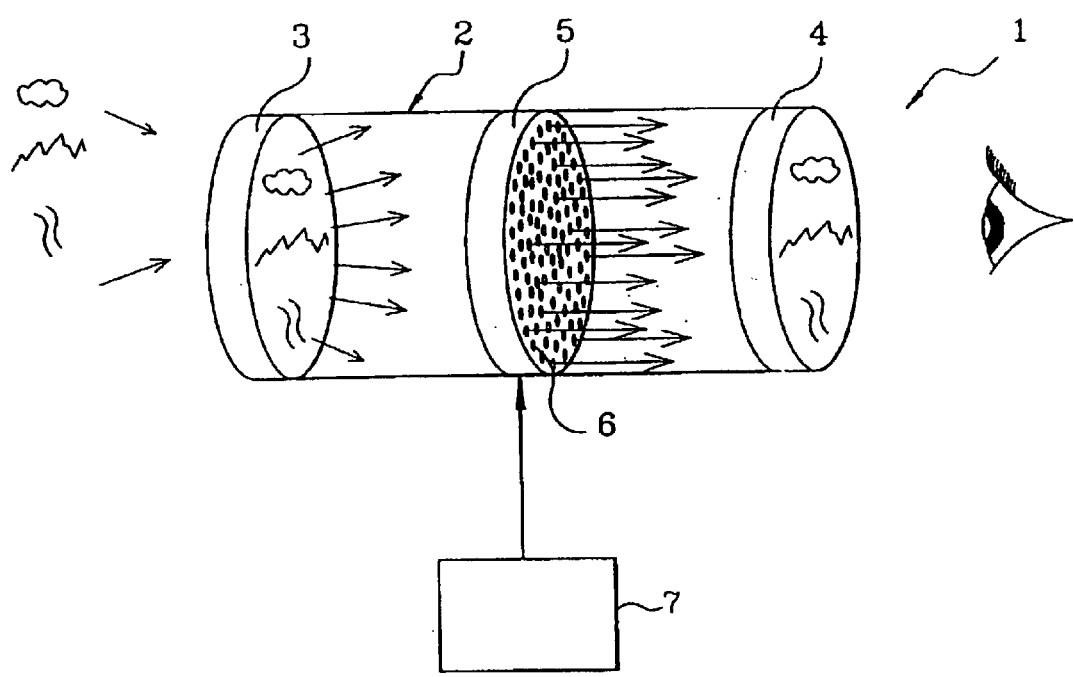
FIG. 1 described here above gives a schematic view of a light intensifier tube.
Figure 2:
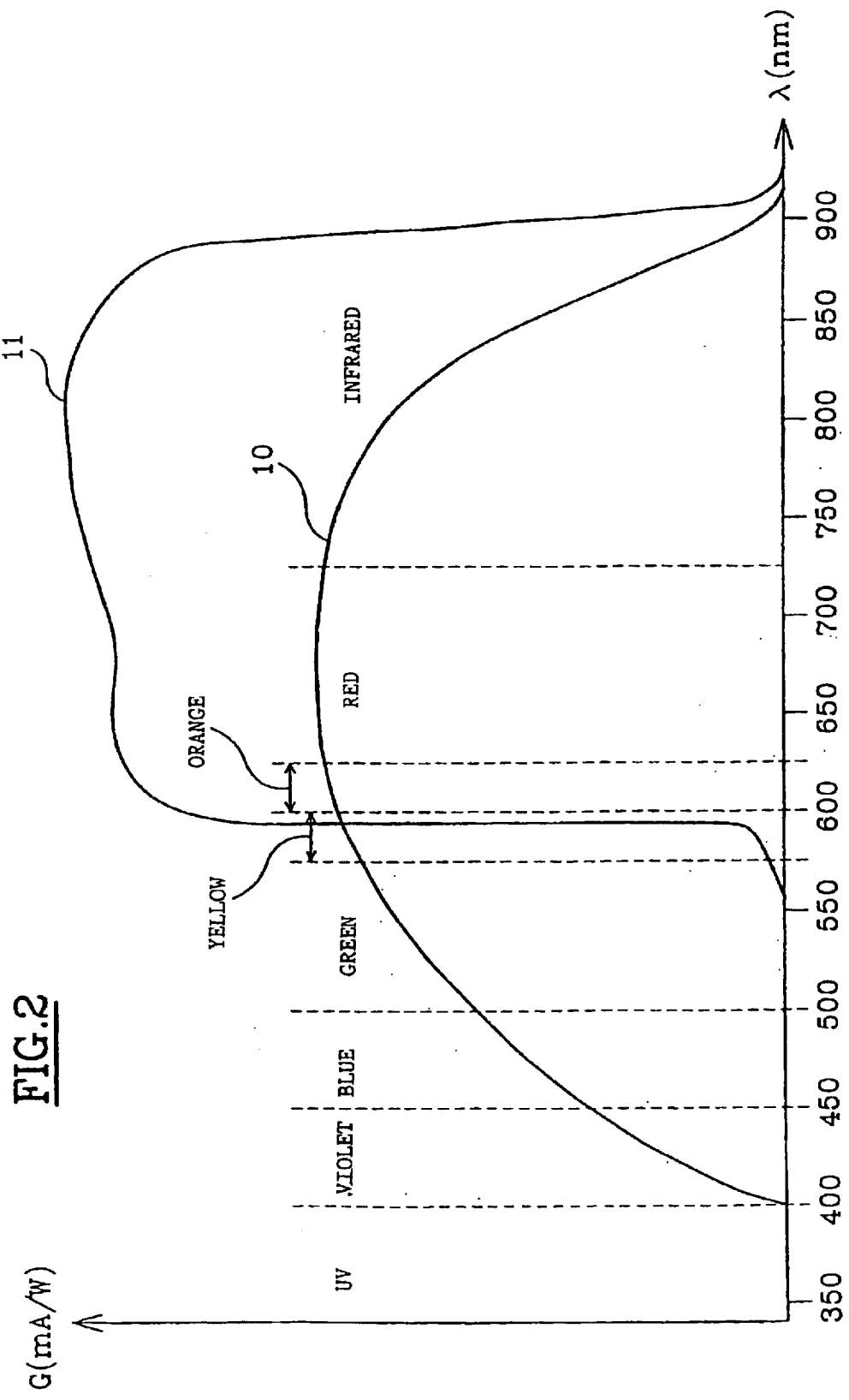
FIG. 2 described here above shows the gain curves of two standard light intensifier tubes.

In FIG. 2, the curves 10 and 11 show certain characteristics of reception phenomena in light intensifier night vision systems of the GEN2 and GEN3 types respectively.

The curve 10 shows that a GEN2 type night vision has maximum sensitivity in the red band.

The sensitivity decreases sharply in the infrared at a wavelength below 900 nm but, on the contrary, it decreases slowly in the visible range up to the violet band.

Dissymmetrical curves of this kind with a sharp threshold at high wavelengths and a long tail towards the short wavelengths are characteristics of reception phenomena in photocathodes. The wavelength threshold corresponds to the energy required from a photon to release an electron of the sensitive element of the photocathode. The slow decrease of sensitivity to the short wavelengths corresponds to the slow reduction of the probability of releasing an electron when the photon has energy that is higher than this required energy.

The curve of sensitivity of the gallium arsenide photocathodes of the GEN3 type night vision systems have the same dissymmetrical shape, with a maximum sensitivity in the infrared at a wavelength of about 900 nm and a mean level of sensitivity that is higher.

It is noted however that, on the curve 11 of FIG. 2, the slow decrease to sensitivity that should appear towards the short wavelengths of the visible range is eliminated owing to a filtering of the visible wavelengths which is usually associated with GEN3 type night vision systems.

Indeed, the filtering of the GEN3 type night vision systems cuts off the transmission of the wavelengths above 600 nm, ranging from the yellow to the ultraviolet so as not to be parasitically affected by the ambient lighting and so as to keep the transmission of the infrared wavelengths and red wavelengths needed for night vision.

Unlike the dissymmetry of the reception spectra, the semiconductor-based light-emitting sources have fairly narrow spectral lines in emission, with a sharp threshold all towards the short wavelengths and a more gradual decrease towards the big wavelengths.

Thus, FIG. 3 shows that the spectrum 16 of the "green aviation" silicon diodes, which are well known, have an emission peak at a 555 nm wavelength, decreasing sharply towards the shorter wavelengths in the blue range and decreasing more gradually towards the big wavelengths in the orange range.

Surprisingly, the invention shows that when the wavelengths of the tail of emission of the lighting means coincide with the wavelengths of the tail of receptivity of a night vision system, there is no phenomenon of dazzling nor any untimely activation of the automatic gain control of the night vision system.

Indeed, in this common wavelengths band, the low residual intensity of the light source combined with the low residual sensitivity of the night vision system does not reach a threshold sufficient to cause any saturation of the night vision system.

The entire value of the light-emitting sources implemented according to the invention is that it gives white light with emission off-centered towards the violet/blue wavelengths band instead of having monochromatic light centered on the green/yellow wavelengths band as in the prior art.

Even more surprisingly, the white light produced by the light-emitting source implemented according to the invention has a bichromatic-dominant spectrum with only one violet/blue peak of chrominance and a wide range of chrominance going from the green to the orange but without any dominant in the third primary color, red.

Figure 8:
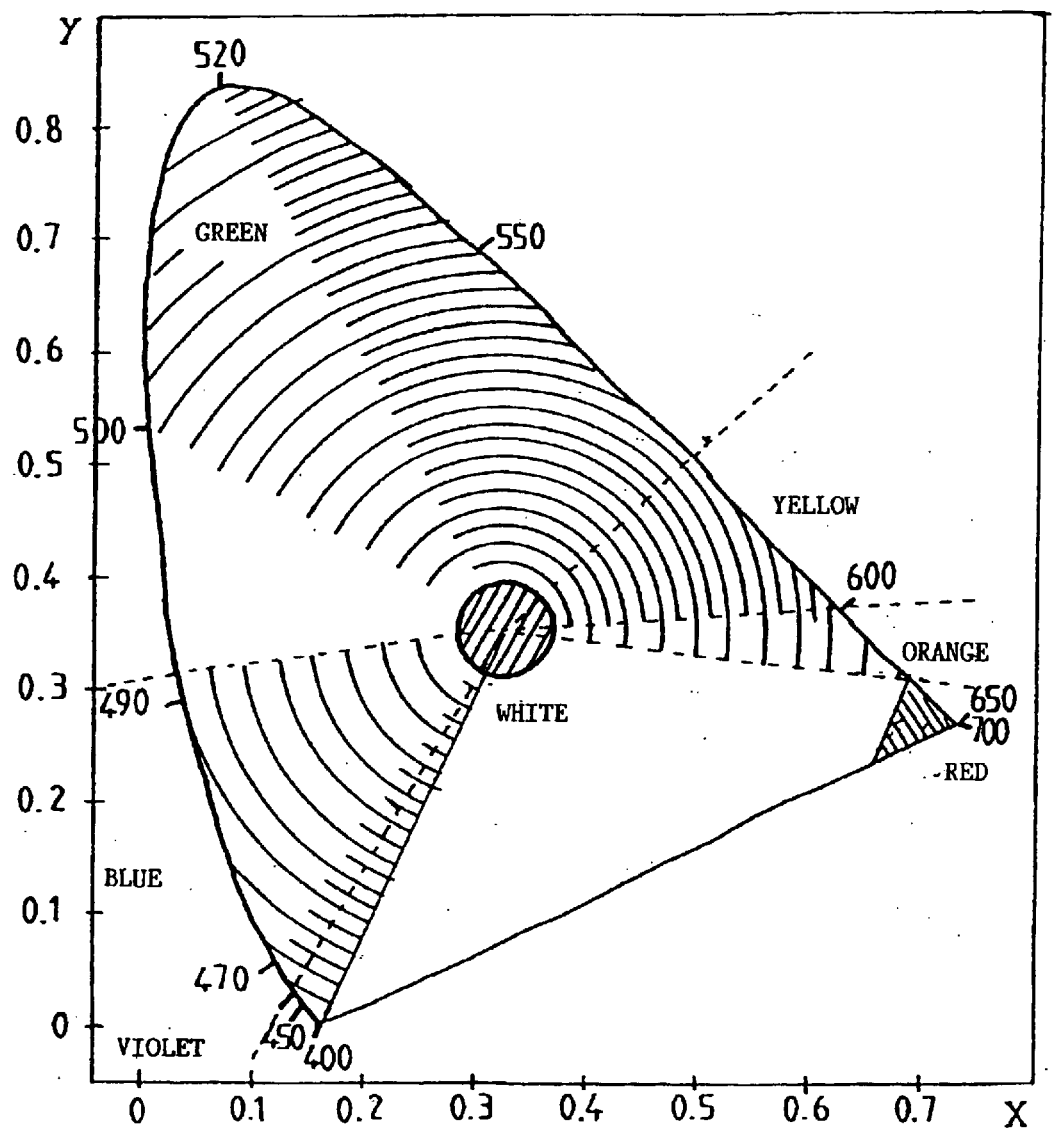
FIG. 8 shows a graph of chrominance of the human eye that gives a schematic view of the spectral dominants of a white light-emitting source implemented according to the invention.

Indeed, as can be seen in the graph of chrominance of the human eye of FIG. 8, it is enough for a light source to have a high peak of emission with a wavelength of about 430 nm to 490 nm and a medium emission in a wavelengths band stretching from about 520 to 600 nm for the weighting of the light to correspond to a white light for the human eye.

It must be noted that the diode T1 WHITE LED and the plate LED WHITE PLANE referred to here above have colorimetrical parameters (x=0, 29: y=0, 30 and x=0, 31: y=0, 32 respectively) that enter precisely into the range of the white.

Furthermore, it is known that the human eye has very high sensitivity in the red range and low sensitivity in the blue range so much so that a polychromatic light is perceived as being white when it contains about 5% of red component, 20% of green component and 75% of blue component in proportion of light intensity. The spectral distribution, shown in FIG. 3, of the light intensity of the light-emitting source shows that the polychromatic light corresponds substantially to this definition of whiteness.

Contrary to the prevailing assumptions in the field of night vision according to which it is necessary to avoid blue light which is supposed to desensitize the rods in the eye and thus inhibit night vision, and according to which it is necessary to avoid white light-emitting diodes which would emit too strongly in the red and the infrared wavelengths, the light-emitting source with its spectrum off-centered towards the violet/blue wavelengths, implemented according to the invention, has very good luminosity for the human eye and does not parasitically affect the night vision systems.

Figure 9:
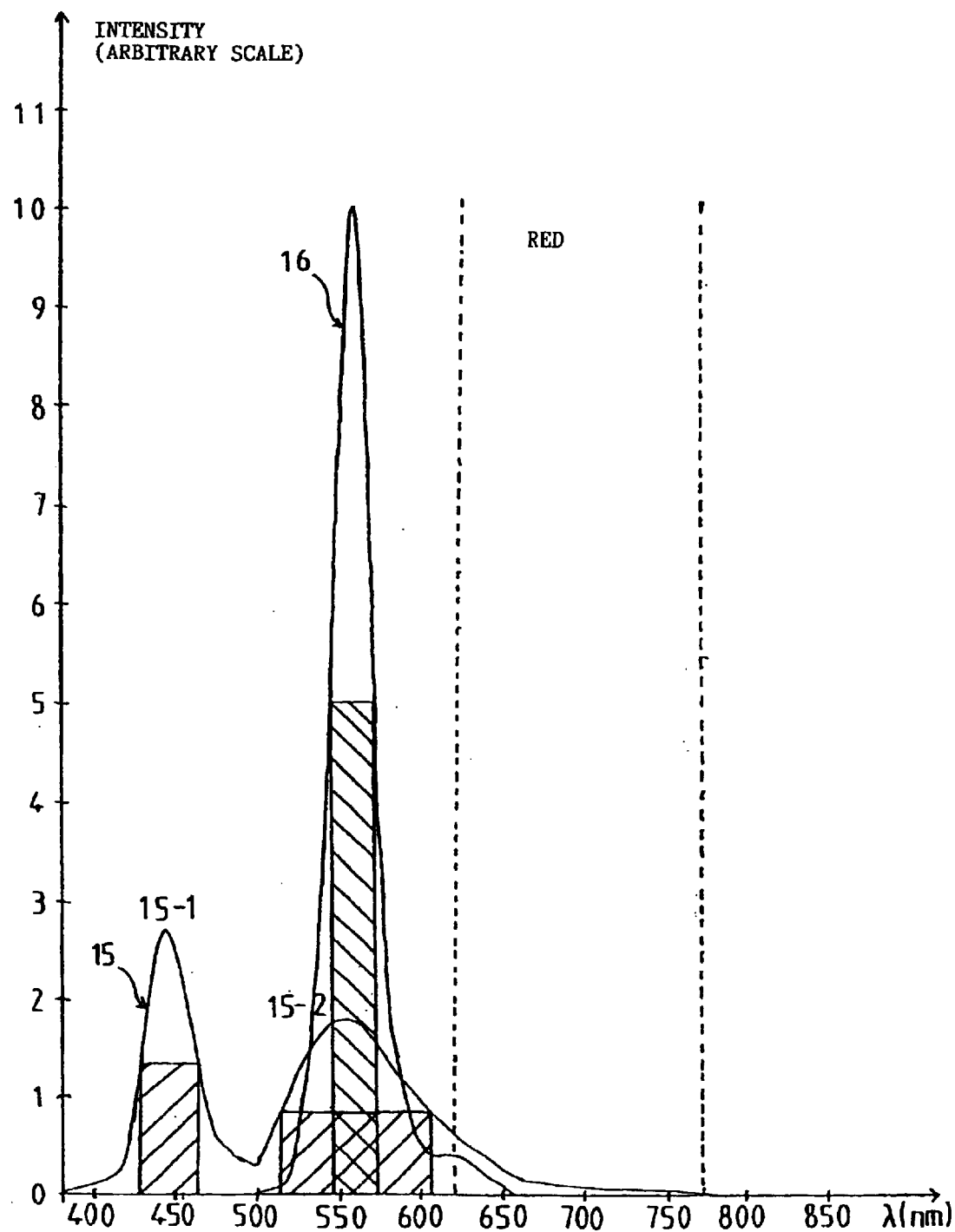
FIG. 9 shows the curves of absolute intensity as a function of the wavelength of the light emitted by a green light-emitting diode and by a white light-emitting diode having comparable luminous power values.

FIG. 9 again shows that, for equal luminous power, the white light-emitting source with high radiant energy in the violet/blue range has residual energy in the red comparable to that of the "green-aviation" light-emitting diodes of the prior art.

The particular feature of the invention is therefore that it makes use of a light-emitting source with high or very high radiant energy in the violet/blue wavelengths band and high or mean radiant energy in the green/yellow and orange wavelengths bands with low residual energy in the red wavelengths band.

Advantageously, the white light source implemented according to the invention gives very good luminosity for the human eye.

Another advantage of the invention is that it prevents any disturbance in night vision devices, even in direct lighting.

The absence of disturbance also mean that it is possible to envisage the use, without filtering, of GEN3 type night vision systems with white light-emitting sources according to the invention.

Indeed, the Applicant has observed that, after retracting the "minus-blue" filters which are usually fitted into any night vision system using gallium arsenide photocathodes, these systems remain compatible with lighting by the white light-emitting sources according to the invention.

In practice, the discovery according to the invention has a consequence of considerable significance, namely the ability to give aircraft pilot visual comfort comparable to that enjoyed in daylight conditions while enabling infrared viewing of the external environment.

Thus, as shown in FIG. 4, it is proposed for example that each incandescent lamp 20 of an aircraft should be replaced by one or more white light-emitting diodes 21 mounted on a screw-in or bayonet type socket 22 compatible with the sleeve 23 of the incandescent lamp 20. This change in light source implies a modification of the supply voltage of the lighting system which should be taken to 3.6 V/20 mA.

In general, a white light-emitting diode can be used for the ambient lighting, the lighting of the panel instruments, the making of light indicators and the backlighting of the graphics display panel. These display panels, which are generally made of Plexiglass, are painted black and include paint-free transparent zones that form graphic characters. The white light-emitting source can also give lighting guided in a translucent board of the instruments panel. Also, several white light-emitting diodes may be arranged in a ramp for the lighting of an instruments panel or for ambient lighting. For ambient lighting, it is preferred however to have a white light-emitting panel which offers the advantage of better distribution of light. Finally, the color indicators are preferably made without any addition of attenuating filters. The light-emitting diodes are simply covered with a hood made of colored plastic.

Furthermore, according to one aspect of the invention, it is proposed to combine several white light-emitting diodes to make aircraft position or navigation lights, flight-training lights, landing lights, etc. By way of an example, FIGS. 5A and 5B give a top view and a sectional view of lighting means 20 comprising a shell 31 made of composite material fixedly joined to a socket 32 in which there is positioned a plurality of light-emitting diodes 33 brazed to a printed circuit 34. The diodes 33 are of the SMC (surface mounted component) type. Their number is chosen so that the lighting means deliver a luminous intensity that complies with the prevailing standards. The interconnection of the diodes 33 by means of the printed circuit 34 is done as a series/parallel interconnection so that the voltage and consumption of the entire unit is compatible with prevailing standards.

Figure 6:
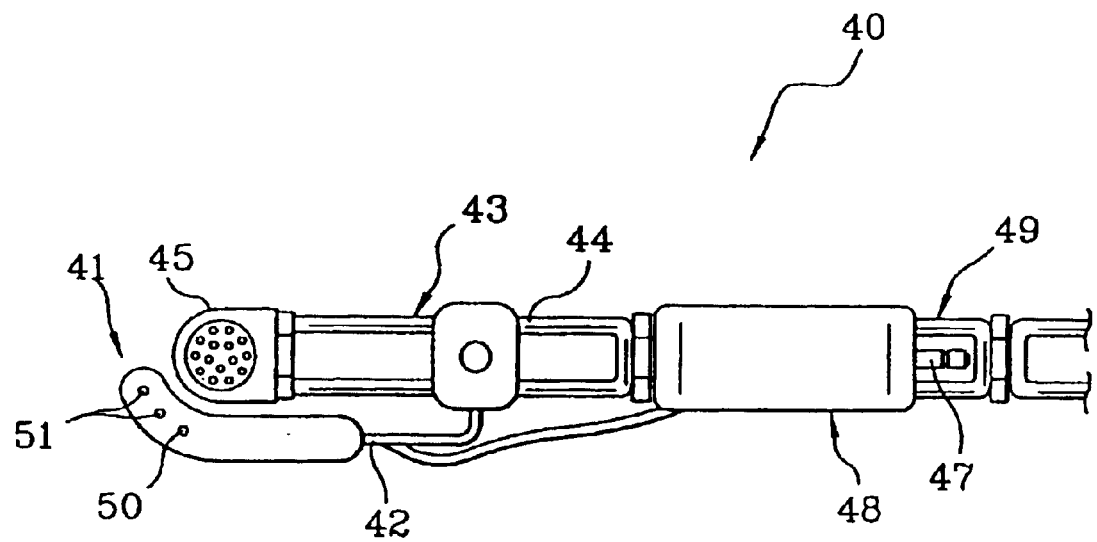
FIG. 6 shows a lip light and illustrates yet another application, according to the invention, of a white light-emitting diode.
Figure 7:
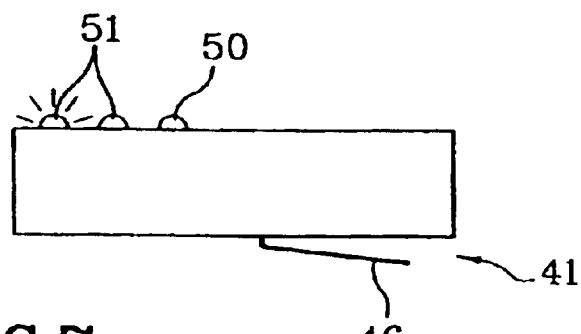
FIG. 7 shows an element of the lip light of FIG. 6.

Finally, FIG. 6 illustrates yet another application according to the invention of a white light-emitting diode and represents a lip light 40 of the type described in the European patent EP 808 082 filed on behalf of the Applicant. The lip light 40 comprises a pack 41 for lighting in the visible and infrared modes mounted at the end of a flexible rod 42. The other end of the rod 42 is fixed in a sliding attachment to the distal part 43 of an arm 44 of the microphone 45. The lighting pack 41, seen in a profile view in FIG. 7, includes an easy switch unit 46 that can be swivelled towards the pilot's mouth. The lip light also comprises a general three-position switch 47, fixedly joined to a control pack 48 fixed to the proximal part 49 of the arm of the microphone. The switch 47 provides for a choice between a visible mode lighting position, an infrared mode lighting position and a lighting off position.

According to the invention, the lighting unit 41 includes an infrared light-emitting diode 50 for the night vision lighting (for example the lighting of a landing strip) and one or more white light-emitting diodes, herein two diodes 51, used to consult road maps or illuminate the cockpit.

It will clearly be seen by those skilled in the art that the present invention is open to various other variants and applications. In general, the present invention can be used to obtain any type of lighting compatible with light intensifier night vision systems. It is clear that the field of application of the invention is not limited to aircraft and can generally be extended to any land-based or sea-based application, especially the beaconing of air strips and runways, the lighting of parking lots, lighting to indicate borders and track center lines, beaconing of obstacles etc.

What is claimed is:

1. A combination of lighting means and of a light intensifier night imaging vision system, the lighting means comprise a white light-emitting source that is not filtered in the red wavelengths, the light-emitting source including at least a white light-emitting diode or a white light-emitting panel which emits polychromatic white light with high radiant energy in the violet/blue wavelengths band and with low residual energy in the red wavelengths band, the lighting means being configured not to disturb the light intensifier night vision imaging system when the white light-emitting source is not filtered in the red wavelengths.

2. The combination according to claim 1, wherein the white light-emitting source emits polychromatic white light that furthermore has high radiant energy in the green/yellow and orange wavelengths bands with low residual energy in the red wavelengths band.

3. The combination according to claim 1, wherein the white light-emitting source has an emission spectrum comprising a dominant in the violet/blue wavelengths band and a dominant in the green/yellow wavelengths band.

4. The combination according to claim 1, wherein the white light-emitting source has a bichromatic-dominant emission spectrum with a violet/blue chrominance peak and a very wide range of chrominance from the green to the orange.

5. The combination according to claim 1, wherein the white light-emitting source has an emission spectrum with a main peak wavelength of less than 492 nanometers, the main peak being a narrow, high-intensity peak, and a secondary peak wavelength ranging from 492 to 622 nanometers, the secondary peak being a wide, medium-intensity peak, with very low residual intensity at wavelengths of over 622 nanometers.

6. The combination according to claim 1, wherein the white light-emitting source gives direct lighting.

7. The combination according to claim 1, wherein the white light-emitting source gives ambient lighting or indirect lighting.

8. The combination according to claim 1, wherein the light-emitting source of white light gives lighting guided in a translucent board of the instruments panel.

9. The combination according to claim 1, to form a colored indicator, especially a green, yellow or red indicator, wherein the light-emitting source comprises a white light-emitting diode covered with a colored hood that is not filtered in the red wavelengths band.

10. The combination according to claim 1, especially to form position indicators, landing lights, anti-collision lights or flight training lights in an aircraft, wherein the light-emitting source comprises a plurality of white light-emitting diodes arranged on a printed circuit.

11. The combination according to claim 10, wherein the printed circuit is fixedly joined to a screw-in or bayonet type socket.

12. The combination according to claim 1, especially to illuminate a cockpit or an instrument panel, wherein the light-emitting source comprises a ramp of white light-emitting diodes.

13. A method to illuminate an aircraft instrument panel or an element in a pilot's field of vision when the pilot uses a light intensifier night vision imaging system, the method comprising:

using, as illumination means, a white light-emitting source that is not filtered in the red wavelengths, the white light-emitting source including at least a white light-emitting diode or a white light-emitting panel which emits polychromatic white light with high radiant energy in the violet/blue wavelengths band and with low residual energy in the red wavelengths band, the illumination means being configured not to disturb the light intensifier night vision imaging system when the white light-emitting source is not filtered in the red wavelengths.

14. The method according to claim 13, wherein the white light-emitting source emits polychromatic white light that furthermore has high radiant energy in the green/yellow and orange wavelengths bands with low residual energy in the red wavelengths band.

15. The method according to claim 13, wherein the white light-emitting source has an emission spectrum comprising a dominant in the violet/blue wavelengths band and a dominant in the green/yellow wavelengths band.

16. The method according to claim 13, wherein the white light-emitting source has a bichromatic-dominant emission spectrum with a violet/blue chrominance peak and a very wide range of chrominance from the green to the orange.

17. The method according to claim 13, wherein the white light-emitting source has an emission spectrum with a main peak wavelength of less than 492 nanometers, the main peak being a narrow, high-intensity peak, and a secondary peak wavelength ranging from 492 to 622 nanometers, the secondary peak being a wide, medium-intensity peak, with very low residual intensity at wavelengths of over 622 nanometers.

18. The method according to claim 13, wherein the white light-emitting source gives direct lighting.

19. The method according to claim 13, wherein the white light-emitting source gives ambient lighting or indirect lighting.

20. The method according to claim 13, wherein the light-emitting source of white light gives lighting guided in a translucent board of the instruments panel.

21. The method according to claim 13, to form a colored indicator, especially a green, yellow or red indicator, wherein the white light-emitting source comprises a white light-emitting diode covered with a colored hood that is not filtered in the red wavelengths band.

22. The method according to claim 13, especially to form position indicators, landing lights, anti-collision lights or flight training lights in an aircraft, wherein the white light-emitting source comprises a plurality of white light-emitting diodes arranged on a printed circuit.

23. The method according to claim 22, wherein the printed circuit is fixedly joined to a screw-in or bayonet type socket.

24. The method according to claim 13, especially to illuminate a cockpit or an instruments panel, wherein the white light-emitting source comprises a ramp of white light-emitting diodes.

25. A method for retrofitting an aircraft lighting system originally including incandescent lamps so as the aircraft lighting system is compatible with a light intensifier night vision imaging system, the method comprising:

replacing at least some of the incandescent lamps with white light-emitting diodes that are not filtered in the red wavelengths and that emit polychromatic white light with high radiant energy in the violet/blue wavelengths band and low residual energy in the red wavelengths band, the white-light-emitting diodes being configured not to disturb the light intensifier night vision imaging system when the white light-emitting diodes are not filtered in the red wavelengths.

26. The method according to claim 25, wherein the white light-emitting diodes furthermore have high radiant energy in the green/yellow and orange wavelengths bands with low residual energy in the red wavelengths band.

27. A method for retrofitting a system of position lights, landing lights, anti-collision lights or flight training lights comprising incandescent lamps, so that the system is compatible with a light intensifier night vision imaging system, the method comprising:

replacing each incandescent lamp with a plurality of white light-emitting diodes that are not filtered in the red wavelengths and that emit polychromatic white light with high radiant energy in the violet/blue wavelengths band and low residual energy in the red wavelengths band, the plurality of white light-emitting diodes being configured not to disturb the light intensifier night vision imaging system when the plurality of white light-emitting diodes is not filtered in the red wavelengths.

28. The method according to claim 27, wherein the white-light-emitting diodes furthermore have high radiant energy in the green/yellow wavelengths band and the orange wavelengths band with low residual energy in the red wavelengths band.

29. Method according to claim 27, wherein the light emitted by the white light-emitting diodes is not filtered in the red wavelengths band.

30. Lighting means for aircraft lights, compatible with a light intensifier night vision imaging system, especially for position lights, landing lights, anti-collision lights or flight training lights, comprising a plurality of white light-emitting diodes arranged on a printed circuit, the lighting means not being filtered in the red wavelengths and emitting polychromatic white light with high radiant energy in the violet/blue wavelengths band and low residual energy in the red wavelengths band, the lighting means being configured not to disturb the light intensifier night vision imaging system when the lighting means are not filtered in the red wavelengths.

31. The lighting means according to claim 30, wherein the printed circuit is fixedly joined to a screw-in or bayonet type socket.

32. The lighting means according to claim 30, wherein the white light-emitting diodes furthermore have high radiant energy in the green/yellow and orange wavelengths bands with low residual energy in the red wavelengths band.

33. The lighting means according to claim 30, wherein the white light-emitting diodes have an emission spectrum comprising a dominant in the violet/blue wavelengths band and a dominant in the green/yellow wavelengths band.

34. Lighting means for an aircraft cockpit or instrument panel, compatible with a light intensifier night vision imaging system, the lighting means comprising:

a ramp of white light-emitting diodes that are not filtered in the red wavelengths and that emit polychromatic white light with high radiant energy in the violet/blue wavelengths band and low residual energy in the red wavelengths band, the ramp of white light-emitting diodes being configured not to disturb the light intensifier night vision imaging system when the ramp of white light-emitting diodes is not filtered in the red wavelengths.

35. The lighting means according to claim 34, wherein the white light-emitting diodes furthermore have high radiant energy in the green/yellow and orange wavelengths bands with low residual energy in the red wavelengths band.

36. The lighting means according to claim 34, wherein the white light-emitting diodes have an emission spectrum comprising a dominant in the violet/blue wavelengths band and a dominant in the green/yellow wavelengths band.

37. A lighting system comprising:

means of lighting in the visible range including at least one white light-emitting diode that is not filter in the red wavelengths and that emits polychromatic white light with high radiant energy in the violet/blue wavelengths band and low residual energy in the red wavelengths band, the means of lighting in the visible range being configured not to disturb the light intensifier night vision imaging system when the at least one white light-emitting diode is not filtered in the red wavelengths;

means of lighting in the infrared range; and switching means to make a choice between a lighting position in the visible range and a lighting position in the infrared range.

38. The lighting system according to claim 37, wherein the while light-emitting diode furthermore has high radiant energy in the green/yellow and orange wavelengths bands with low residual energy in the red wavelengths band.

39. The combination according to claim 1, wherein the polychromatic white light furthermore has high radiant energy in the green/yellow or orange wavelengths bands with low residual energy in the red wavelengths band.

40. The method according to claim 13, wherein the polychromatic white light furthermore has high radiant energy in the green/yellow or orange wavelengths bands with low residual energy in the red wavelengths band.

41. The method according to claim 25, wherein the polychromatic white light furthermore has high radiant energy in the green/yellow or orange wavelengths bands with low residual energy in the red wavelengths band.

42. The method according to claim 27, wherein the polychromatic white light furthermore has high radiant energy in the green/yellow or orange wavelengths bands with low residual energy in the red wavelengths band.

43. The lighting means according to claim 30, wherein the polychromatic white light furthermore has high radiant energy in the green/yellow or orange wavelengths bands with low residual energy in the red wavelengths band.

44. The lighting means according to claim 34, wherein the polychromatic white light furthermore has high radiant energy in the green/yellow or orange wavelengths bands with low residual energy in the red wavelengths band.

45. The lighting system according to claim 37, wherein the polychromatic white light furthermore has high radiant energy in the green/yellow or orange wavelengths bands with low residual energy in the red wavelengths band.

46. The lighting means according to claim 33, wherein the polychromatic white light furthermore has high radiant energy in the orange wavelengths band.

47. The lighting means according to claim 37, wherein the polychromatic white light furthermore has high radiant energy in the orange wavelengths band.

48. A system having a light intensifier night vision imaging system wherein the improvement comprises:

at least one light-emitting source of polychromatic white light that is not filtered in the red wavelengths with high radiant energy in the violet/blue wavelengths band and with low residual energy in the red wavelengths band, the at least one light-emitting source being configured not to disturb a light intensifier night vision imaging system when the at least one white light-emitting source is not filtered in the red wavelengths, and the at least one light-emitting source illuminating one of an indicator lens, a position indicator, a landing light, an anti-collision light, a flight training light, a cockpit, an instrument panel and a translucent board.

49. A system having a light intensifier night vision imaging system wherein the improvement comprises:

at least one white light-emitting diode that is not filtered in the red wavelengths which emits polychromatic white light with high radiant energy in the violet/blue wavelengths band and with low residual energy in the red wavelengths band, the at least one white light-emitting diode being configured not to disturb a light intensifier night vision imaging system when the white light-emitting diode is not filtered in the red wavelengths, and the at least one white light-emitting diode illuminating one of an indicator lens, a position indicator, a landing light, an anti-collision light, a flight training light, a cockpit, an instrument panel and a translucent board.

* * * * *